April 24, 1945.  W. F. ZIMMERMANN  2,374,256
GEAR TRANSMISSION
Original Filed Sept. 12, 1941   4 Sheets-Sheet 2

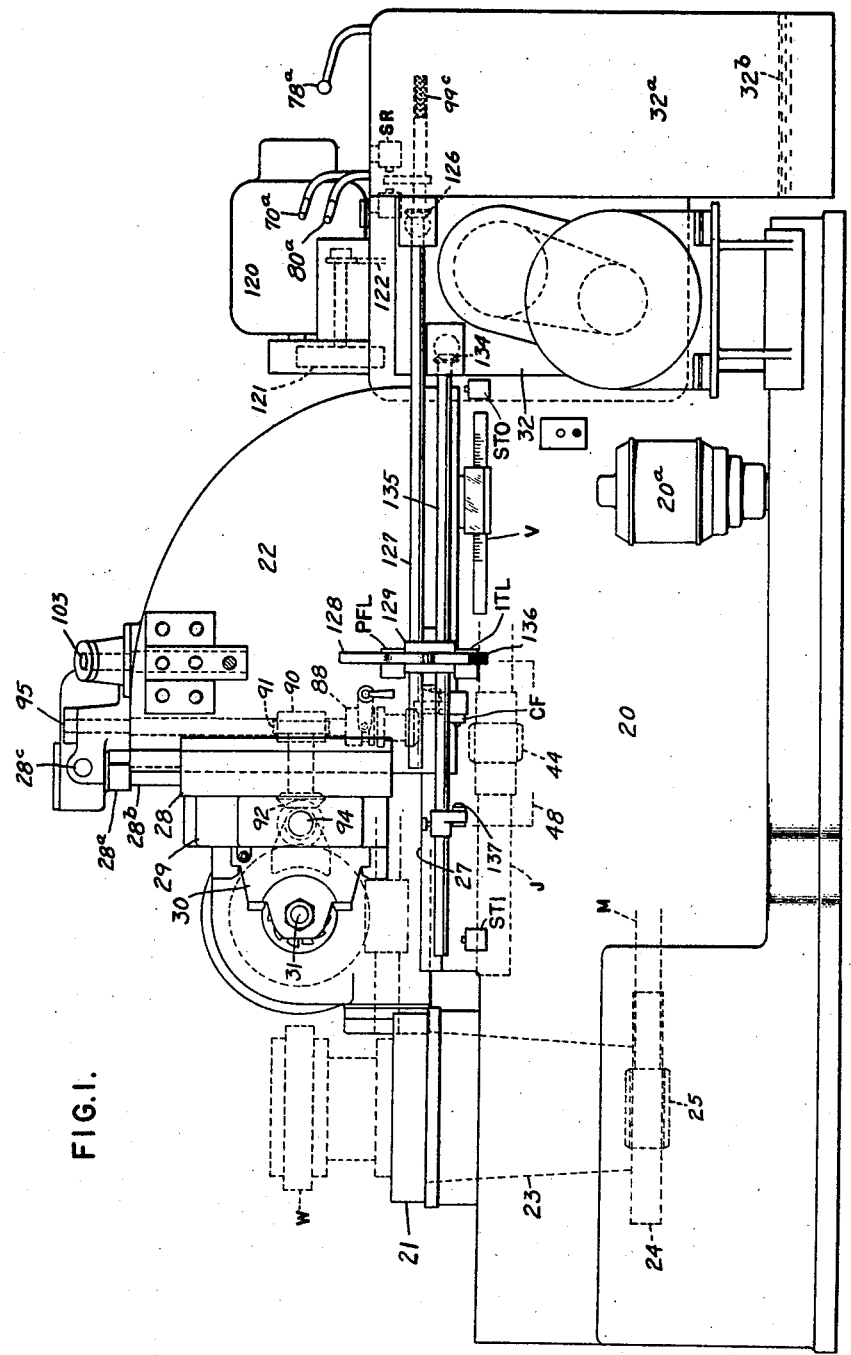

INVENTOR
William F. Zimmermann
Albert F. Nathan
ATTORNEY

April 24, 1945. W. F. ZIMMERMANN 2,374,256
GEAR TRANSMISSION
Original Filed Sept. 12, 1941 4 Sheets-Sheet 3

INVENTOR
William F. Zimmermann
Albert F. Nathan
ATTORNEY

April 24, 1945.  W. F. ZIMMERMANN  2,374,256
GEAR TRANSMISSION
Original Filed Sept. 12, 1941   4 Sheets-Sheet 4
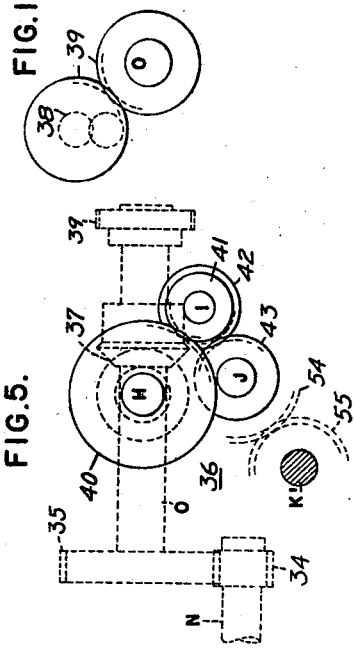
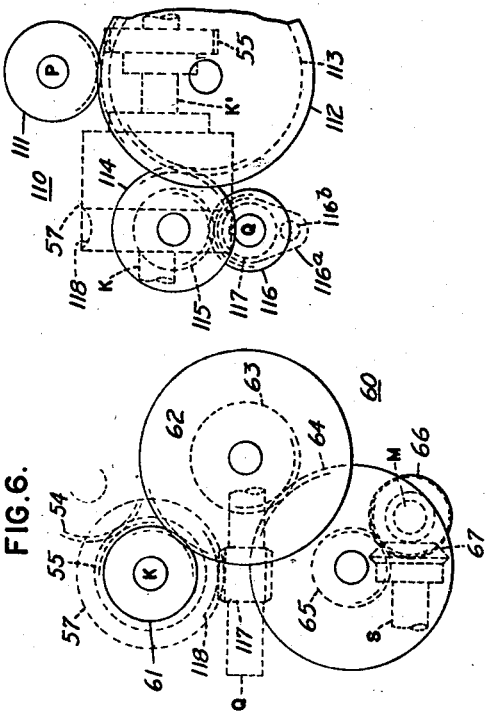
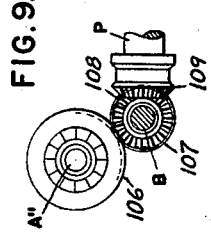
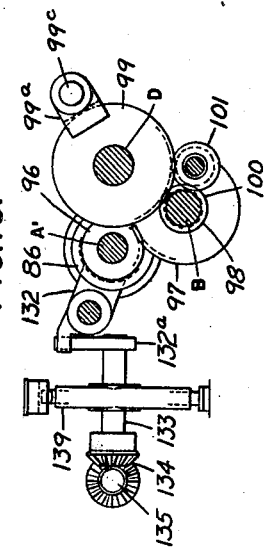
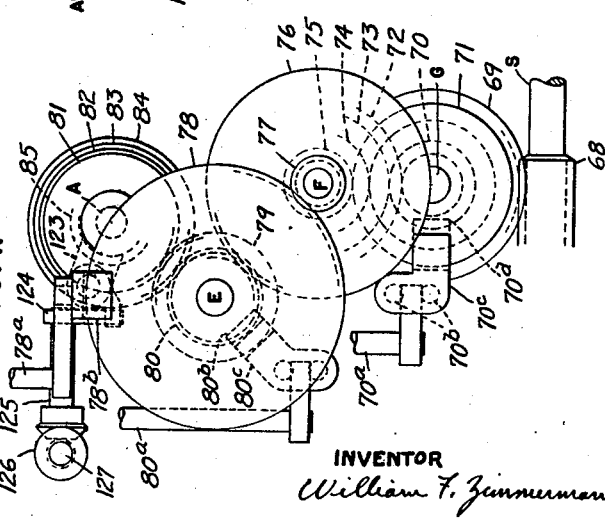
INVENTOR
William F. Zimmermann
Albert F. Nathan
ATTORNEY Patented Apr. 24, 1945

2,374,256

UNITED STATES PATENT OFFICE 2,374,256

GEAR TRANSMISSION

William F. Zimmermann, Maplewood, N. J., assignor to Gould & Eberhardt, Incorporated, Irvington, N. J., a corporation of New Jersey Original application September 12, 1941, Serial No. 410,512. Divided and this application July 13, 1943, Serial No. 494,469

2 Claims. (Cl. 74—283)

The present invention relates to improvements in power transmission systems suitable for machine tool usages and is concerned more particularly with transmission systems wherein the movements of the elements ultimately propelled are to be synchronized as well as directionally coordinated and related to effect a given operation or sequence of operations.

This application is a division of my copending earlier application Serial No. 410,512, filed Sept. 12, 1941, and like the parent case, a worm gear hobbing machine will be taken as illustrative of a typical use and preferred embodiment of the instant invention.

A primary aim of the invention is to render available a simplified transmission wherewith it becomes possible to obtain and maintain a predetermined operating relation between, for example, the tool and the work, notwithstanding that the machine may be set up for tooling work of one type at one time and of another and opposite type at another time. The invention aims to develop a transmission whereby it becomes feasible and practical to use but one machine for the selective cutting, for example, of right hand worm gears and left hand worm gears, and obtaining and preserving in each opposite set-up, like relations of the hob with the blank irrespective of the hand of the gear being cut and its direction of rotation.

A further aim of this invention is to render available a transmission system embodying two or more power drives adapted for selective operation to effect relative movement between the machine tool elements in transverse paths and in opposite directions in those transverse paths, but so constituted and arranged that the direction of operation of one of the drives is dependent upon the direction of operation of the other and automatically rationalized therewith.

By way of illustration, in a worm gear cutting machine, the work blank may revolve counterclockwise and the hob slowly fed tangentially from left to right, and the back traverse of the hob is from right to left. When the machine is set up for cutting gears of the opposite hand, the work rotates oppositely, the hob is fed oppositely, and the back traverse is opposite. The tangential movement of the hob along the blank makes it necessary to impose on either the blank or the hob, a supplemental movement calculated to synchronize the relation between the teeth of the hob and the blank while simultaneously moving the one past the other. The present invention proposes a gearing arrangement whereby the foregoing results may be readily achieved and maintained for both feed and traverse movements. When, however, the gears are being cut by the infeeding method, the direction of infeed and of the out traverse of the cutter does not change with a change in hand of the gear being cut and there is no need for any supplemental motion of the hob relative to the blank. When one combines the infeed method of cutting with the tangential feed method of cutting, a condition is presented potentially confusing because under a given set-up, "forward" and "reverse" motions of various gear trains and resulting motions are compatible, but under another they are not. The present invention, accordingly, further aims to render available an improved transmission system that eliminates the possibility of confusion by an arrangement of gearing and other elements of the transmissions such that harmonious movements, and harmonious reverse reversals are obtained, as and in accordance with, the direction the machine is operated, i. e., the hand of the gear being cut and the method employed in the cutting thereof.

The invention further aims to provide a reversible drive transmission for a plurality of elements in which a supplemental movement is provided, the action of which is consistently additive or consistently subtractive upon the trains effected, irrespective of the direction in which one of the trains may be propelled relative to the other. As applied to tangential hobbing machines, the revolutions of the hob and the rotation of the work must be synchronized notwithstanding the tangential feed movement of the hob. When, however, the direction of work rotation and the tangential feed is changed, and not the cutter rotation (which must be "down cutting" for both right hand and left hand gears) synchronization must again be obtained. By the present invention a differential mechanism is embodied in the feed and index trains ahead of the work table and index reversing means therein. A back drive from the feed train through lead change gearing, imposes a supplemental motion on the differential which is subtractive on the work index train. However, as a reversal in the work rotation also reverses the feed, and the feed controls the differential action, the resulting effect on the work index drive is additive when a subtractive effect is again wanted. By arranging the several trains so that motions therein or in selected portions thereof may be reversed, notwithstanding reversals produced in other trains, a pre-existing relation of motions may be restored, and in the present instance, the differential producing mechanism may be caused to function subtractively under either set of conditions.

A further aim of this invention is to provide a transmission having the above mentioned features and characteristics and which incorporates a rapid traverse drive train for moving the cutter in or out, to the left or right quickly, and without disturbing the synchronous relation between the tool, work, and feed previously established for the actual tooling operation. By the arrangement of this invention, the use of the quick traverse train, prior to or subsequent to, the actual tooling operation does not effect the precision timing that exists between the cutter and work.

As above mentioned, the differential action is not required, nor is a tangential feed train required, when using the mechanisms for the cutting of gears by the infeed method, and such elements and trains are, in accordance with this invention conveniently disconnected and locked out without impairing or effecting the utility of other trains or trains of mechanisms common to both types of operations.

The problem, therefore, in a machine adapted to cut both left hand and right hand gears, with a hob that has a portion designed for rough cutting using a centifeed motion, (meaning a feed movement toward the center, i. e., radially of the blank) and another portion designed for finish cutting using a tanfeed motion, (meaning a feed movement tangentially of the work blank) is to be able to shift from centifeed to tanfeed, without losing lead, and in a single operation, and in so doing automatically obtain a differential in the work index rates, when tanfeeding, operative in a direction compatible with a feed against work rotation, regardless of the hand of the gear being cut. And in the same machine provide means to preserve, or to render it possible to maintain, the centifeed transmission operative in an infeeding direction and the hob downward cutting, for each hand of gear to be cut.

In the present embodiment of the invention a main drive motor, acting through speed change gearing, drives the cutter spindle in one direction only. Power is taken off the cutter drive train and rotates the work blank after passing through, in the order named, a differential mechanism, and a speed change and reverse table index gearing. The feed drive is taken off the work index drive at the table side of the speed change and reversing mechanisms therein, and after passing through a set of feed change gears, divides into two branches. The one branch is here used selectively to feed the cutter in or out, and the other branch to feed the cutter tangentially. From the latter branch train, power is directed back to the casing of the differential, through lead change gearing provided, to obtain the necessary synchronization between the cutter and the work during the lateral feed movement of the cutter relative to the work. Inasmuch as the drive (from the main motor) through the differential does not change direction, whereas the main feed and sub-feed trains and work trains do, and since one of the feed trains controls the differential action, a relation restoring device is incorporated in the back drive to the differential to render its action consistent with the results desired notwithstanding reversals in motion effected beyond the differential.

Likewise, in the infeed branch train a relation restoring means is embodied to restore directions of motion therein in compatibility with "in" and "out" cutter feeds notwithstanding reversals in the index and main feed works from which both branch feed trains derive their feed power.

A selector clutch is provided at the juncture of the two branch feed trains with the main feed train and a shifting of that clutch from one effective position to another changes the cutter feed motion from an "in" or "out" feed (without differential action) to a tangential (with differential action), or conversely.

Between the selector clutch and the main feed change speed gearing another clutch is provided to disconnect the main feed power from both of the branch feed trains. On the power outgoing side of the main power clutch, the rapid traverse power source (reversible) is connected in. Accordingly, with the main feed clutch disengaged, the rapid traverse source may be employed to propel the cutter carriage "in" or "out" or to the "left" or "right" through the respective branch feed trains. If the selector clutch is positioned to transmit through the infeed branch, the direction of motion of the rapid traverse source must be properly related to the position of the motion restorer in that branch feed train. If the selector clutch is positioned to transmit through the tangential feed train, the direction of motion of the rapid traverse source must be consistent with producing a traverse movement to the right or to the left, as the case may be. And inasmuch as the tangential feed branch conveys power back to the differential casing, the use of the rapid traverse source to quickly move the cutter to the left or to the right, also operates through the lead gearing and the differential to drive the work table index train, the hob is able to clear the work while moving tangentially at a relatively rapid rate.

In reversing the work and feed movements the work carrier drive train and all trains dependent thereon are reversed. However, and irrespective of the direction of table rotation, the relation restoring means, provided preferably in the lead change gearing, maintains the cutter synchronized with the work by imposing a supplemental movement upon the work carrier always in the right direction with respect to the direction of lateral or tangential feed. The instrumentalities provided render it possible to preserve in one machine the individual characteristics and entities of several. The alteration in the back drive to the differential mechanism is made, as with the alteration made in the index gearing, only when changing over the machine from right hand operations to left hand operations, or conversely, and, after the transmission is set up for one direction of operation, the change from centifeed to tanfeed is effected by operating a single lever. Idle or other time consuming operations in correlating directions are thereby avoided.

While the present invention is depicted in connection with a machine wherein the centifeed and tanfeed movements are movements imparted to the cutter, it is to be understood that other uses are contemplated and that one or both movements may be imparted to the work carrier or apportioned, as may be desired, between the work and the tool.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention; drawings depicting a preferred typical construction have been annexed as a part of this disclosure and, in such drawings, like characters of reference denote corresponding parts throughout all the views; of which:

Figure 1 is a side view of a worm gear cutting machine embodying the present invention.

Fig. 5 is a detail illustration of a portion of the drive to the hobbing cutter of the machine illustrated in Fig. 1, including the speed change gearing.

Fig. 6 is a detail illustration of a portion of the drive to the work spindle index shaft, including the differential mechanism and index change speed gearing.

Fig. 7 is a detail illustration of the feed works drive including the built-in change feed gearing.

Fig. 8 is a detail view of the lead change gearing; and Fig. 9, the power connection from the tangential feed train (the radial feed train).

Fig. 10 is a detail figure illustrating the means in the centripetal feed train for maintaining the power feed toward the work axis in both directions of work rotation.

Fig. 11 is a detail of a lubricating pump drive.

Figures 2, 3:
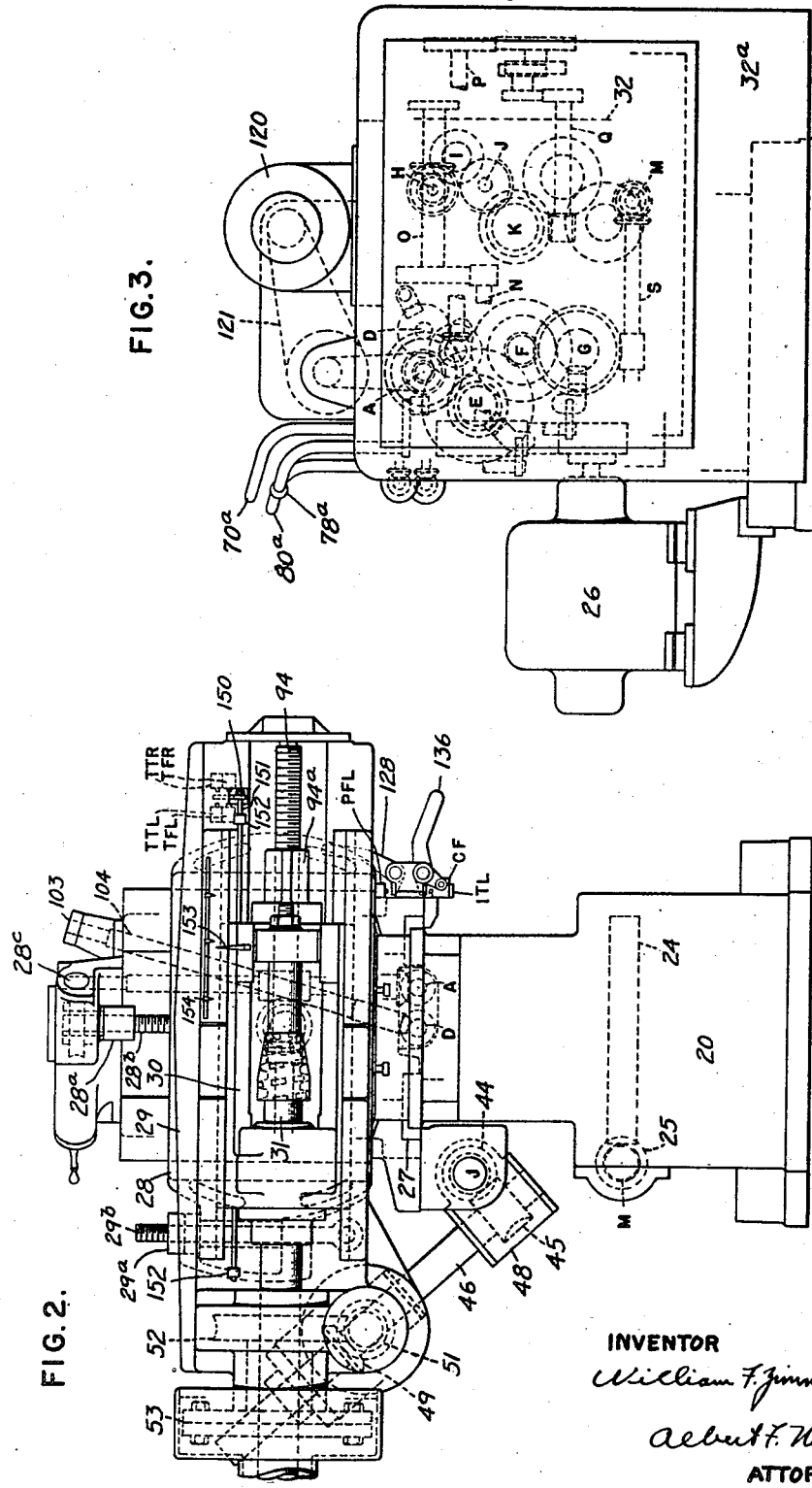
Figs. 2 and 3 are front and rear end views of the machine illustrated in Figure 1.

Referring more particularly to Figure 1 of the drawings, the invention is shown embodied in a machine having a substantial base member 20, which supports a rotatable work carrier 21 and a relatively translatable tool carrier 22. The work carrier is mounted to rotate on a vertical axis in a tapered bearing 23 and is driven at its lower end by a worm wheel 24, worm 25, and index shaft M.

A tool carrier 22, is mounted on ways 27 for movement toward or away from the work table axis and carries on the table side thereof a vertically movable tool slide 28. On the front face of the slide is an angularly adjustable head 29 in which is mounted, for lateral translation, a cutter spindle supporting carriage 30. With relation to the axis of the work spindle, the tool spindle 31 may be shifted perpendicularly toward or away from the work axis, parallel thereto, and laterally across the axis in a plane normal to the work axis or at an angle thereto. Various combinations of movements between the tool and the work are utilized in the cutting of worm gears and will be described more fully hereinafter.

The tool slide 28 is adjusted vertically on the stanchion 22 by means of a worm and worm wheel driven nut 28ª and elevating screw 28ᵇ. The screw 28ᵇ is secured to the slide 28 and shifts axially through the nut 28ª as the latter is rotated. A hand crank placed on the rear end of the worm shaft 28ᶜ provides the means for actuating the elevating nut. When the cutter slide has been shifted to the proper position relative to the plane of the work W, the guide straps are tightened and slide is securely clamped in set position.

Normally the pivotal tool head 29 assumes a horizontal position and clamped to the slide 28.

Should angular adjustment of the spindle axis be necessary to adapt the machine to using an oversized hob; the head is unclamped from the slide and the adjusting nuts 29ª on a weight carrying bolt 29ᵇ (Fig. 2) are backed off or tightened to thereby tilt the hob axis and so correct for the difference in lead angle due to the increased diameter of the hob.

To the rear of the machine a gear case 32 is attached and which houses and has journaled thereon, all the several trains of mechanisms necessary to propel the hob and work at their proper relative speeds and directions during a normal tooling cycle.

A gear case guard 32ª extends around two sides of the gear case 32 and contains in its lowermost parts an oil reservoir 32ᵇ. Whenever the main drive is operating, the pump 38 takes oil from the reservoir and discharges it over the gears, shafting, and moving parts within the gear case 32, and also to drip tubes (not illustrated) overlying the changeable speed, index, feed and lead gearing.

Coolant material is supplied to the work and cutter from a catch basin formed about the main frame 20, by a pump (not illustrated) that is separately driven by motor 20ª.

Figures 4, 12:
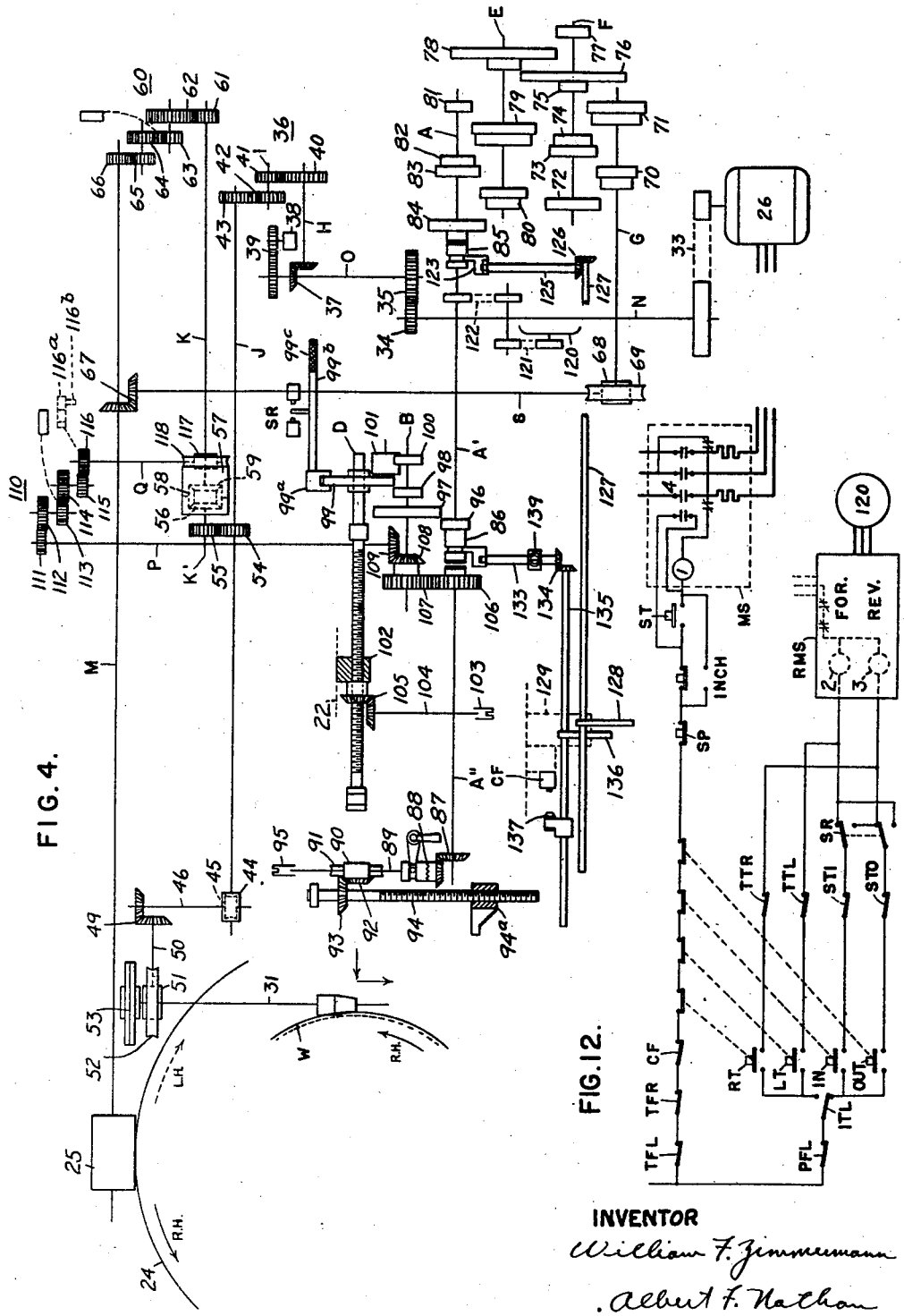
Fig. 4 is a line diagram of the power transmission mechanisms and their controls as applied to a gear hobbing machine.
Fig. 12 is a schematic wiring diagram of the machine and the interlocking thereof with mechanical controls.

Referring to the line diagram Fig. 4, and to the detail illustrations Figs. 5 to 11, inclusive, in conjunction with Fig. 3, it will be seen that power from the main drive motor 26 enters the gear case on the operator's side and drives shaft N through the multiple V belt 33. A pair of connecting gears 34, 35, transfers the power to a continuing shaft O which drives the speed change gearing 36 through bevel gears 37 and shaft H, and also a lubricating pump 38 through gears 39.

The speed change gearing 36 is between the shaft H and the cutter main drive shaft J and includes pick-off gears 40, 41, 42, and 43, revolving on axes H, I, and J. The shaft J extends toward the work table and has splined thereto a worm 44 that meshes with the worm gear 45 mounted upon an angularly adjustable shaft 46. The worm and worm gear and shaft just mentioned are journaled in a casing 48 which pivots on shaft J and also slides therealong. The upper splined portion of the shaft 46 drives the bevel gears 49, worm shaft 50, worm 51, and worm wheel 52 mounted on the axis of the hob spindle 31. The hob spindle is releasably connected to the worm wheel 52 through flanged index plates 53 so that when using multiple thread hobs the hob may be precision indexed for each thread without disturbing lead.

On the tool side of the change speed gearing 36, power is taken to rotate the work spindle 23. Gears 54, 55 transmit the power to a shaft K' which drives a bevel gear 56 that forms part of a differential mechanism 57. Assuming the casing of the differential to be stationary, the gear 56 drives spider gears 58 which in turn reversely drive gear 59 on the output shaft K. Index change gears 60, which includes pick-off gears 61, 62, 63, 64, 65, and 66, and provision for insertion of an intermediate gear for obtaining reversals, conducts the power from the differential mechanism to the main index shaft M that connects with worm gear 24 underlying the work table.

On the table side of the index change speed and reverse gearing 36, the tool feeding transmission takes off its power. Starting with bevel gears 67, power is conducted into shaft S which extends across the machine and drives a worm 68 and worm wheel 69 on shaft G. Two double-gear sliding units 70 and 71 are mounted on shaft G and transmit the power at any one of four rates to a parallel shaft F through spaced gears 72, 73, 74, 75 fixed thereon. The four speeds of shaft F are transmitted to a shaft E through either of two back gears 76, 77 and the sliding unit 78 on shaft E. Shaft E transmits the 8 speeds to a main feed shaft A through two more double-gear sliding units 79 and 80 and spaced gears 81, 82, 83, 84 fixed on shaft A; the three serially arranged change speed mechanisms affording 32 selective cutter feed speeds in shaft A.

Coaxially related with the shaft A, a second feed shaft A' is mounted to receive the feed power through a main feed clutch 85 at one end and to deliver the feed power at its other end to either of two sub-feed transmissions through a dual clutch mechanism 86. When the dual clutch 86 is shifted from neutral to the left (in Fig. 4) the feed power is transmitted from shaft A' to shaft A'' thence through bevel gears 87, one of which is splined to shaft A''', recutting clutch 88, vertical shaft 89, worm 90, worm wheel 91 (located at the pivotal axis of the head) to bevel gears 92 and 93, to the tangential feeding screw 94 journaled in the head 29. To provide for the vertical adjustment of the tool slide 28, the worm 90 is splined to the shaft 89, and is movable therealong with vertical movements of the tool slide. The upper end of the worm shaft 89 is provided with a crank receiving portion 95 by which the operator may shift the job laterally, by hand. The feed screw 94 coacts with a traveling nut 94ᵃ secured to the laterally movable cutter spindle carriage 30.

When the dual clutch 86 is shifted to the right (in Fig. 4) a gear 96 thereon transmits power to a gear 97 on shaft B from which it may be directed selectively in reverse directions to shaft D through gears 98, and 99 or gears 100, 101, and 99. The shaft D is the centripetal feed screw shaft which is rotatably but non-translatably journaled to the main frame of the machine, and coacts with a traveling nut 102 secured to the stanchion 22 to feed the cutter or hob radially toward the work axis. When the gear 99, which is splined to the screw shaft D is shifted to an intermediate position (illustrated in Fig. 4) the screw shaft may be rotated manually by applying a crank to the upper end 103 of a shaft 104 which is geared at 105 to the shaft D.

The primary purpose of the motion restoring mechanism comprising gears 98, 100, 101 and sliding gear 99 is to render it possible to power feed the cutter in (toward the work axis) irrespective of the direction of operation of the main feed works whose direction of operation is definitely related to the direction of work table movement. During the cutting of a right hand worm gear, the work blank W is rotated counterclockwise (as viewed in Fig. 4) and for a left hand gear it is rotated clockwise. Opposite directions of work rotation are obtained at the index change gear mechanisms 60 by inserting or removing an idler gear (between gears 63—64) and since the tool feed is taken from the index shaft M, a reversal in its motion also reverses the feed motion. Accordingly, the direction restorer 98, 100, 101, and 99 in the centifeed sub-transmission is provided to maintain the directional motion in the driven shaft D unaffected by changes in the directional motion of its driver A'. In other words, if the main feed gearing has its direction changed, gear arrangement 98—101 may be utilized to restore in the feed shaft D the previously existing condition of motion.

As previously mentioned, no differential in the relation of work rotation to hob rotation is required when the teeth of the worm gear are cut by the infeed method of hobbing. That method may be employed in the instant machine for rough cutting the blank, using the tapered or undersize end portion of the hob. A tapered hob is used so that its undersize cutting edges will not mutilate or deform the teeth of the gear blank as the hob is progressively fed radially into the work, as would follow if the hob was of full tooth depth.

Correct and full tooth form on the blank is later obtained, however, by feeding the hob laterally (after infeeding to the correct center distance), for the cutting action then becomes a generating motion instead. The lateral shifting of the hob introduces a further problem of reconciling the phase relation of the work with the hob as the latter is bodily shifted in the direction of its own axis, i. e., tangentially and against the direction of work rotation.

When cutting a right hand gear with a tangential feed of the hob acting against or in opposition to the work rotation, the effect of tanfeeding is to accelerate beyond normal the relative tangential motion between hob and gear and the action could be likened to the action of an ordinary milling cutter on the blank. To prevent such boring action, the relation between feed and index motions must be properly correlated. With the present transmission, such correlation is attained by the differential mechanism, above referred to, which responds to either or both tangential feed and index motions.

As illustrated in Fig. 4, a branch power line is taken off the tanfeed sub-transmission through gears 106, 107, the latter of which is loose on shaft B and includes a bevel gear 108, as a unit therewith. The gear 108 drives a bevel gear 109 on a shaft P that extends across the gear case of the machine to changeable lead gearing 110. The change lead gearing, which includes pick-off gears 111, 112, 113, 114, 115, 116, and provision for insertion of an intermediate gear (between gears 113–114) transmits the power derived from the tanfeed train to a worm shaft Q at a rate selected by the pick-off gears used. And shaft Q, through the worm 117 and worm wheel 118 drives the casing of the differential mechanism 57. If the ratio of the lead gearing 110 is such as to cause the differential casing to revolve slowly in the same direction as driving gear 56 therein, the speed of the output shaft K is slightly reduced. Shaft K is the driver for the work index train and a reduction in the speed thereof correspondingly reduces the rate of work rotation. Thus by installing separate lead gearing and taking power for the differential producing mechanism off the tan-feed train, the relation between the hob and the blank may be synchronized even though the one is simultaneously moving past the axis of the other.

The correlation mechanism is not needed when centifeeding (infeeding the hob) and to insure that it is inactive during centifeeding, the differential drive is taken off only the tanfeed transmission, which is independent of the centifeed transmission. When cutting gears solely by the infeed method, it is necessary to lock the differential out of action to prevent creeping, and that is done by removing lead gears 116 and applying in its place a lead locking plate 116ᵃ (Fig. 8).

The locking plate comprises a disc that fits the shaft Q and carries a pin 116b that fits into a socket in the gear case. When the lock is applied to the shaft, the differential casing is securely locked against rotation in either direction.

It has been explained above, that the tangential feed of the hob is, in accordance with this invention, always against the work rotation so that the lead of the hob does not pull the work. When setting up a machine for left to right hand operation all that is required to be done to obtain proper work index motion is to add or remove an idler gear in the index change speed train 60, and the consequential reversal in motion at that point also reverses the main feed gearing and the tanfeed sub-transmission. At the same time the correct lead gears 110 are installed with or without an intermediate gear depending upon the hand of the gear to be cut. The intermediate gear in the lead train is used, according to the present system of gearing, when an intermediate gear is used in the index train and serves therein as a relation restorer, on reversals in feed motion, to effect propulsion of the differential housing consistently one-way. Thus the action of the differential mechanism in correlating the relative rates of rotation of the hob and the work during tangential feeding is the same when cutting either right handed gears or left handed gears.

In setting up a machine for new work pieces it is convenient to shift the hob laterally or radially by power, and so that power shifting may be effected at a relatively rapid rate a separate reversible motor 120 is embodied in the transmission. The motor 120 has a belt and chain connection 121, 122 with the intermediate feed shaft A', and when the main feed clutch 85 is disengaged, the traverse motor may be operated to propel either of the two sub-feed transmissions and effect the shifting motion at a rapid rate in either direction. When the power traverse is used for traversing the cutter stanchion in or out there is, of course, no change in the phase relation between the cutter and the work, those elements remain stationary. However, in traversing the cutter to the left or to the right, the work and cutter may be in mesh and one or both must rotate as the cutter is axially advanced or withdrawn. In the present system of gearing, the phase relation between the hob and the blank is not disturbed during the right or left traversing movement because the drive to the compensating differential mechanism is effective whenever the tanfeeding sub-transmission is in operation, and there is a back drive therethrough which rotates either the cutter or work in timed relation as the cutter is shifted laterally to clear the work. Hence, the phase relation of the driven elements is not disturbed. During hand feeding to the left or right the synchronized relation between the hob and the blank is also maintained by virtue of the same gear connections.

The machine of the present embodiment is controlled by a system of levers and controls interlocked in a manner such as to prevent simultaneous incompatible movements. With reference to the main feed clutch 85 (Fig. 4) the spool thereof has two positions, neutral and engaged with gear 84. A clutch shifter 123 tracks the groove in the spool and is shiftable laterally by a short lever 124 mounted on a shaft 125. The shaft 125 is geared at 126 to a second shaft 127 extending along the side of the machine, and which has splined thereto an actuating lever 128. The lever 128 is mounted between flanges of a bracket 129 mounted to the side of the movable carrier 22. The lever 128 extends generally vertically and when it is rocked outwardly (away from the machine), the clutch 85 engages the power feed.

With reference to the dual clutch 86, a similar shifter 132 tracks a groove in the spool thereof and is shifted laterally by a short lever 132a on a shaft 133. The shaft 133 is geared at 134 to a shaft 135 which also extends through the traveling bracket 129. A lever 136 is splined to the shaft 135 and travels therealong as the carrier 22 shifts. Lever 136, however, has three positions, tanfeed position, neutral position, and centifeed position. When the lever is lifted to its uppermost position, the clutch 86 is engaged with gear 106 and the tanfeed transmission is operative, and when the lever 136 is rocked to its lowermost position the clutch engages with gear 97 and the centifeed train is operative. Spring actuated detent means, indicated at 139 are provided to hold the clutch in each of its positions.

The shifting of the sliding gear 99 is effected manually by means of a gear straddling shoe 99a secured to an axially shiftable shaft 99b, the outer end 99c of which is knurled to provide a suitable hand grip portion.

Each of the three serially arranged feed change mechanisms has its own gear shift lever. Gears 70-71 of the first series may be brought selectively into mesh by lever 70a operating through axially shiftable guide rods 70b and gear straddling shoes 70c and 70d spaced thereon. Back gear unit 78, forming part of the second series, is straddled by a shoe 78b operated from a balled lever 78a. And gear units 79 and 80 of the third series are arranged for axial shifting selectively to four different positions by means of lever 80a and gear straddling shoes 80b and 80c which are mounted and guided similar to the shifters of the first series.

To the foregoing machine structure there may be added various types of mechanical trip mechanisms and interlocks to facilitate a gear cutting operation and for the purpose of illustration there is herein disclosed a species of trip mechanism that is more fully described and claimed in copending applications of Granger Davenport Serial No. 410,491, filed Sept. 12, 1941, and Serial No. 464,711 filed Nov. 6, 1942.

Briefly, the operation of the main motor 26 is controlled by a magnetic starter MS, whereas, the rapid traverse motor 120 is controlled by a reversing magnetic starter RMS. Each starter is of standard conventional construction and includes coils 1, and 2 and 3, respectively, for actuating the main switches. Referring to the diagram of the control circuit for the main drive motor 26 (Fig. 12) the push button starting switch ST is normally open and when pressed will close a circuit across the coil 1 which affects closing of the main switch contacts 4 of the starting panel. Simultaneously a holding circuit is established around the starting switch so that intermediate release of the button ST does not stop the motor. The control just explained is effective provided all of the other series connected switches shown in the diagram are in their closed position illustrated. In the circuit ahead of the starting switch there is a double pole double throw switch marked "Inch" that is utilized to inch the tool carriers from position to position. The Inch push button switch has one pair of its contacts connected around the starting switch ST and its other and normally closed pair in series therewith, so that the pressing of the button to inch the tool carrier in or out, left or right, breaks the circuit to the starting switch as well as to the holding circuit. Thus the motor 26 will run so long as the Inch switch is held depressed.

Just ahead of the inching switch the main stop switch SP is serially connected which when depressed will also break the starting switch holding circuit and the motor stops. In series ahead of the stop switch SP there are four serially connected interlocking switches (which will later be explained) and in series ahead of those are three microswitches TLF, TFR, and CF, respectively. The microswitch CF is the switch that is carried by the movable stanchion 22 and arranged to be actuated by the abutment 137 on the rod controlling the dual clutch 86. Assuming all of the series switches in this circuit are closed and the cutter is centifeeding, the power movement continues until the switch CF is engaged by the abutment 137 and opened thereby. Immediately the circuit to the magnetic coil 1 of the starting switch is broken and the power feed immediately stops. The setting of the abutment 137 is, it will be understood, a precision setting so that the cutter will stop infeeding at the precise center distance required.

When the instant machine is arranged for tanfeeding the cutter, the centifeed switch CF will be closed (by the rocking of abutment 137 off the switch button which movement throws clutch 86 over to its tanfeeding side) and stop switch TFL and TFR control the stopping of the tanfeeding movement left and tanfeeding movement right, respectively. The switches TFL and TFR are mounted in the pivotal head 29 on opposite sides of a short actuating lever 150. A rod 151 which passes through the laterally movable cutter slide 30 connects with the lever 150 and has mounted for adjustment thereon two dogs 152, one at either side of the slide. By appropriately setting the dogs 152, the tangential feeding motion imparted to the slide may be stopped at the completion of the cut in either direction of travel.

Also carried by the traveling slide is a pointer 153 which in cooperation with one or more adjustable points 154 may be used to provide a visual indication of the zone of beginning or of finishing of the actual tooling operation. This indicating means may be used as a guide for example, to aid in hand traversing or power traversing to selected intermediate point where the power feed is to be engaged for the remainder of the lateral movement.

The four serially arranged switches that are in the starting circuit for the main motor (above mentioned) form part of the double pole double throw push button switches in the control circuit of the reversible rapid traverse motor 120. With reference to the lower part of Fig. 12, the reversible motor starting switch is provided with two solenoids 2 and 3 (illustrated in dotted lines), the former for actuating the forward switch and the latter for actuating the reverse switch of the motor. Inasmuch as the traverse motor is used to propel the cutter tangentially to the right or to the left at a rapid rate or in or out at a rapid rate, two sets of controls therefore are provided. For the tangential traverse control there is a push button switch RT connected in a control circuit for the reverse solenoid 3 and a second push button switch LT connected in the circuit to the forward solenoid 2. In each of the solenoid control circuits there is also a limit switch TTR and TTL, respectively, both of which normally are closed. Assuming the circuit is otherwise complete up to the push buttons RT or LT the pressing of one of those buttons will cause motor operation in the forward or reverse direction so long as the button is held depressed and the cutter slide will be propelled to the right or to the left accordingly. If the operator holds the button depressed too long the cutter slide will engage one of the dogs 152 and then shift the rod 151 and lever 150 which lever engages one of the switches TTR or TTL (mounted in the cutter head) depending upon the direction of travel, thus opening the motor control circuit and stopping the power traverse.

In a similar manner push button switches marked "In" and "Out" and serially connected stanchion traverse limit switches STI and STO are in a parallel circuit and also control the forward and reverse solenoids of the reversible magnetic starter RMS. Again assuming all of the switches of the stanchion traversing control circuit up to the In and Out buttons are closed, the pressing of one of the buttons will cause the stanchion to be propelled in or out as the case may be. When the stanchion has reached a predetermined limit of travel in either direction one of the normally closed switches STI or STO is engaged by the stanchion and opened and the circuit to the starting panel RMS is opened and the traverse stops.

All of the push button switches RT, LT, In, and Out are in series with a single switch PFL which is mechanically interlocked or controlled by the power feed lever 128 in such manner that when the lever is rocked to a position engaging the power feed clutch 85 the switch PFL is opened and the rapid traverse motor 120 cannot be started by pressing any of the push buttons RT, LT, etc. When, however, the power feed control lever 128 is rocked to a position disengaging the clutch 85, the switch PFL is closed and the power traverse motor may be operated.

Although two sets of control buttons for the power traverse motor are provided, one set for the cutter traverse right and left, and the other set for the cutter traverse in or out, the two sets are never available for concurrent operation. To prevent confusion in this respect a selector switch ITL is connected in series with the switch PFL and arranged to connect one or the other of the two sets of traverse motor control buttons with the main power line. The selector switch ITL is also interlocked with the infeeding and tanfeeding control lever 136 in such manner that when the lever is rocked to a position engaging the dual clutch 86 with the tanfeeding sub-transmission (gear 106, etc.) the switch ITL is moved to a position completing a portion of the control circuit including the right and left push button switch RT and LT. At the same time the circuit to the In and Out switches is opened. When the lever 136 is rocked to its other position, that is, to engage the centifeed transmission (gears 96, 97, etc.) the switch is actuated to a position completing a portion of the circuit to the In and Out buttons, and opening the circuit involving the right and left control buttons. Accordingly, when the dual clutch 86 is set up for infeeding, the In and Out buttons take the control for forward and reverse movements of the motor exclusively, and when the clutch 86 is set for tangential feeding, the right and left control buttons take control exclusively; but neither set of buttons has any control over the motor if the power feed lever 128 is shifted to a position wherein main feed clutch 85 is engaged.

With reference to Fig. 4, it will be observed that a motion direction restoring device, including sliding gear 99 is positioned between the dual clutch element 86 and the centifeed screw D. Therefore, irrespective of the direction that the traverse motor 120 may be operated, the motion in the screw shaft D may be reversed by sliding the gear 99. When the machine is set up for cutting a left or right hand gear, using the infeed method of cutting for a portion at least of the tooling, the sliding gear 99 will be shifted by rod 99c to restore in shaft D proper directional rotation for power infeeding the cutter irrespective of the direction of rotation the main feed works. Ordinarily, therefore, the In and Out legends on the stanchion traverse control buttons are in themselves meaningless unless the terms are related to direction of movement of the stanchion and which must be consistent in their operation regardless of the hand of the gears being cut. That is, irrespective of whether the work index is clockwise or counterclockwise it is desirable to have the cutter stanchion move in (toward the work) whenever the In button is pressed, and away from the work whenever the Out button is pressed. Therefore, to avoid the confusion that might otherwise exist by reason of the reversibility of the index and main feed drives and the effect thereof on the elements of the transmissions, another set of switches are incorporated in the In and Out control circuits of the reversing motor 120. The reversing switches SR (Fig. 12) are, in effect, direction restoring or coordinating switches and are arranged to be actuated in unison by the sliding gear shifting rod 99c (Fig. 1). One of the restoring switches SR is in the IN circuit and selectively closes the circuit to the forward solenoid 2 or to the reverse solenoid 3. The other restoring switch SR is in the Out control circuit and selectively closes the circuit to the reverse solenoid 3 or the forward solenoid 2.

As shown in the diagram the restoring switches SR are connected so that the motor 120 runs forward in the one direction when the push button In is pressed, and reversely under another condition when the push button In is pressed. Forward and reverse rotations of the motor 120 are, however, necessary depending upon the position of sliding gear 99 which has been previously shifted. The gear shifting rod 99c is connected to operate the restoring switches SR in unison and in a direction compatible with the positioning of the sliding gear 99. Accordingly, irrespective of the position of gear 99 the control of the power traverse motor is interlocked and related therewith as always to give a traverse "in" when the In button is pressed, and always a traverse "away" from the work whenever the Out button is pressed.

It will be noted that no restoring-a-relation set of control switches is necessary in the control circuit for left and right cutter traverse, for the reason that all rapid traverse directional relations of the elements in the tanfeeding train are controlled by the fixed relations of the gearing that lies between the rapid traverse motor 120 and the ultimate feed screw 94.

To insure against inadvertent simultaneous operation of the main motor 26 and the traverse motor 120, the control circuits therefore are further interlocked by connecting the starting circuit of the main motor 26 in series with each of the push buttons RT, LT, In and Out as shown in the diagram. Each of the push buttons comprises a pair of normally closed contacts and a pair of normally open contacts. The normally closed pair of each button is connected in series with the starting circuit of the main motor 26, as represented by the dotted lines of the diagram (Fig. 12), and the open pair of contacts of each button is part of the control circuit for the reversible motor 120. Therefore, all of the control buttons for the rapid traverse motor must be released before the starting circuit of the main motor may be completed. If the main motor 26 is running, a pressing of any of the buttons for the traverse motor, at once stops the main motor. However, pressing of any one of the traverse motor buttons, under this condition, does not necessarily mean that the traverse motor will operate, for its operation is again dependent upon the positions of the power feed control lever 128 as well as the position of the tanfeed lever 136. Insofar as the main motor 26 is concerned, all of the control buttons for the motor 120 are stop switches.

As an illustration of how the transmission mechanisms of this invention may be caused to function in a given machine, reference will be made to the gear cutting machine disclosed, and assuming it is desired to cut gears by the composite method, infeed followed by tangential feed, the machine will be initially set up for the number of teeth, hand, and lead, and feed and speed of the cutter according to the machine's chart which shows the gears to be used and their location. The dual clutch lever 136 will be set for infeeding and likewise the sliding gear 99. The work and cutter will be mounted on their spindles and the tapered portion of the hob centralized with relation to the work. The vertical slide 28 is clamped, and the cutter slide 30 and the stanchion 2, left unclamped.

The machine is then started and the cutter fed by hand to cutting position. The infeed precision abutment 137 is preset to stop the infeed at the precise center distance and the tangential feed stops 152 also properly set to stop the machine when the cutter has completed the tangential tooling. The power feed is then engaged and the cutter is power fed radially into the work until the sensitive switch CF is actuated whereupon the infeed stops. Without more ado, the operator shifts the dual clutch lever 136 to its tanfeeding position. That single operational movement disconnects the centifeed and engages the tanfeed transmissions, and simultaneously the abutment 137 rides off the sensitive switch CF and the latter closes, thus restoring that portion of the main motor starting circuit, and the drive is restarted by pressing the start button ST.

The power feed is now tangentially of the work, and always in a direction opposed to the work rotation, this relation being automatically obtained by the present system of gearing when the machine is initially set up for the work in hand. Hence nothing need be done when shifting from centifeed to tan feed when cutting either right or left hand gears except throw the control lever 136 and start the machine. The tangential feed continues operating until the slide reaches the present dog 152 and actuates one of the limit switches TFL or TFR. Immediately the machine stops and the finished gear is removed.

The transmission has, of course, other machine tool applications and is capable of different operating cycles, the foregoing being representative of a preferred use of the invention.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. A power transmission combining a source of power and an element to be propelled thereby, a train of power transmitting connections therebetween including therein a differential mechanism having a rotatable but normally stationary differential housing, a second train of power transmitting connections deriving power from the outgoing side of said differential and connected to propel another element, means for rendering said second train of mechanisms selectively effective or ineffective, and a third train of power transmitting connections leading from said second train back to the housing of said differential mechanism for rotating the latter, and change speed means in said third train for determining the relative speed of rotation imparted to said differential housing thereby to correlate the speeds of said two drive trains whenever said second train of power transmitting connections is rendered effective.

2. The combination set forth in claim 1 in which motion reversing means is embodied in said third train for oppositely correlating the rates of speed of said two drive trains.

WILLIAM F. ZIMMERMANN.